(12) United States Patent
King et al.

(10) Patent No.: US 7,302,977 B2
(45) Date of Patent: Dec. 4, 2007

(54) FUEL-DISPENSING NOZZLE INHIBITOR

(75) Inventors: Timothy J. King, Connersville, IN (US); J Bradley Groom, Oxford, OH (US); Poul Hedevang, Bonn (DE)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 11/236,342

(22) Filed: Sep. 27, 2005

(65) Prior Publication Data

US 2006/0096662 A1    May 11, 2006

Related U.S. Application Data

(60) Provisional application No. 60/651,788, filed on Feb. 10, 2005, provisional application No. 60/629,908, filed on Nov. 22, 2004, provisional application No. 60/615,416, filed on Sep. 30, 2004.

(51) Int. Cl.
    *B65B 1/04* (2006.01)
(52) U.S. Cl. .............. 141/367; 141/350; 141/302; 220/86.2
(58) Field of Classification Search .......... 141/301, 141/302, 349, 350, 367; 220/86.2
    See application file for complete search history.

(56) References Cited

U.S. PATENT DOCUMENTS

| | | |
|---|---|---|
| 4,034,784 A | 7/1977 | Ball et al. |
| 4,248,279 A | 2/1981 | Warmbold |
| 4,687,034 A | 8/1987 | Graiff et al. |
| 5,212,864 A | 5/1993 | Bates et al. |
| 5,322,100 A | 6/1994 | Buechler et al. |
| 5,385,179 A | 1/1995 | Bates et al. |
| 5,439,129 A | 8/1995 | Buechler |
| 6,302,169 B1 | 10/2001 | Pulos |
| 6,382,270 B1 | 5/2002 | Gzik |
| 6,539,990 B1 | 4/2003 | Levey et al. |
| 6,607,014 B2 | 8/2003 | Webb |
| 6,923,224 B1 * | 8/2005 | McClung et al. ........... 141/350 |
| 2002/0020465 A1 | 2/2002 | Gzik |
| 2002/0170622 A1 | 11/2002 | Webb |
| 2004/0025967 A1 | 2/2004 | Henry |
| 2005/0000592 A1 | 1/2005 | Bartlett |

FOREIGN PATENT DOCUMENTS

| | | |
|---|---|---|
| DE | 4039269 | 2/1992 |
| DE | 10157090 C1 | 4/2003 |
| EP | 1262355 | 12/2002 |
| EP | 1262355 A | 12/2002 |
| EP | 1319545 A | 6/2003 |
| FR | 2741014 A | 5/1997 |
| GB | 2230765 A | 10/1990 |
| WO | WO9400351 A | 1/1994 |

OTHER PUBLICATIONS

Page from European Search Report for EP06250718, dated Oct. 4, 2006.

* cited by examiner

*Primary Examiner*—Steven O. Douglas
(74) *Attorney, Agent, or Firm*—Barnes & Thornburg LLP

(57) ABSTRACT

A nozzle inhibitor is positioned in a filler neck closure assembly to prevent a user from pumping unleaded fuel into a diesel fuel tank. The nozzle inhibitor blocks full insertion of a small-diameter unleaded fuel nozzle into the filler neck closure assembly yet allows full insertion of a large-diameter diesel fuel nozzle into the filler neck closure assembly.

30 Claims, 12 Drawing Sheets

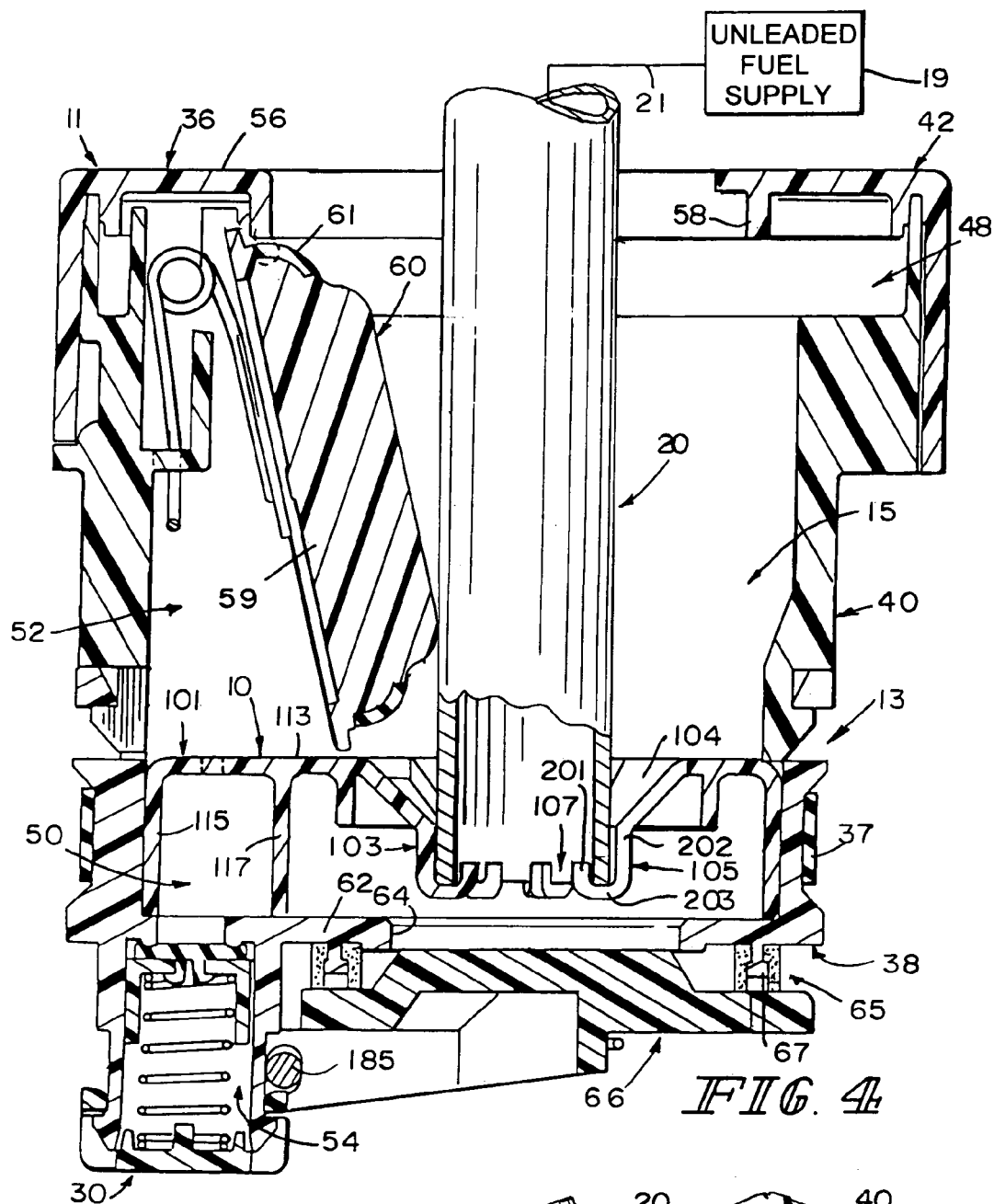
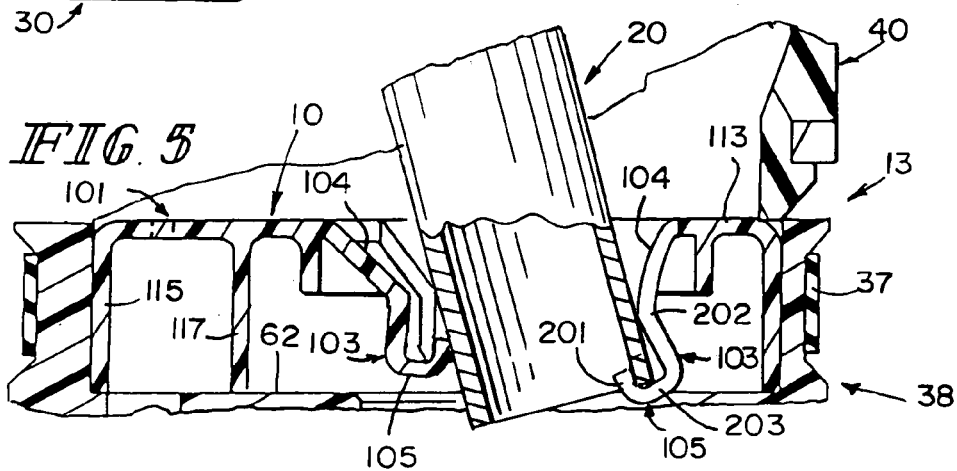

FUEL-DISPENSING NOZZLE INHIBITOR

This application claims priority under 35 U.S.C. § 119(e) to U.S. Provisional Application Ser. No. 60/615,416, filed Sep. 30, 2004; Ser. No. 60/629,908, filed Nov. 22, 2004; and Ser. No. 60/651,788, filed Feb. 10, 2005, which are expressly incorporated by reference herein.

BACKGROUND

The present disclosure relates to a filler neck closure assembly, and particularly to a filler neck closure for use in a fuel tank filler neck. More particularly, the present disclosure relates to a device for preventing the introduction of a nozzle for unleaded fuel into the filler neck of a fuel tank of a motor vehicle fitted with a diesel internal combustion engine.

Unleaded fuel should not be introduced into a fuel tank filler neck of a motor vehicle powered by a diesel engine. It is customary to use a small-diameter nozzle (e.g., 22 mm or less) to dispense unleaded fuel into a fuel tank filler neck and to use a larger-diameter nozzle (e.g., 24 mm or more) to dispense diesel and leaded fuel.

SUMMARY

A nozzle inhibitor is configured to be coupled to a fuel tank filler neck and arranged to allow only a fuel-dispensing pump nozzle having an outer diameter that is greater than a specified minimum diameter to be inserted into the filler neck to a depth sufficient so that a user may dispense fuel from that nozzle into a fuel tank coupled to the filler neck. Such a nozzle inhibitor inhibits insertion of a small-diameter unleaded fuel-dispensing nozzle into a fuel tank filler neck, yet allows a large-diameter diesel fuel-dispensing nozzle to be inserted into the fuel tank filler neck.

In an illustrative embodiment, the nozzle inhibitor is mounted inside a fuel tank filler neck. For example, in some embodiments, the nozzle inhibitor is interposed in a space provided in a capless filler neck between a pivotable outer appearance door and a pivotable inner flapper door. In another embodiment, the nozzle inhibitor is located in a fuel tank filler neck adapted to be closed by a fuel cap near a mouth opening into an outer passageway formed in that filler neck. In each case, the nozzle inhibitor includes several flexible fingers or retention arms arranged to contact a tip or diameter of any fuel-dispensing nozzle inserted into the filler neck through the mouth. The fingers include "features" to catch the tip or diameter of any small-diameter unleaded fuel-dispensing nozzle and block further movement of such a nozzle to reach a fuel-conducting passageway leading to the fuel tank.

The fingers included in the nozzle inhibitor also include (but are not limited to) cam ramps arranged to engage only the tip or diameter of a large-diameter diesel fuel-dispensing nozzle (but not a small-diameter unleaded fuel-dispensing nozzle) that is being inserted into the filler neck. Movement of a large-diameter nozzle against the cam ramps and further into the filler neck causes the fingers to spread apart so that the hooks are moved in radially outward directions away from a central axis extending through the filler neck and thus unable to catch the tip of the large-diameter diesel fuel-dispensing nozzle. By spreading the fingers apart, a widened nozzle-receiving opening is defined between the fingers to allow movement of the large-diameter diesel fuel-dispensing nozzle past the fingers and through the widened nozzle-receiving opening further inwardly into the fuel tank filler neck. Such spreading of the fingers is sufficient to "disable" the nozzle inhibitor to allow proper insertion of the large-diameter diesel fuel-dispensing nozzle into the filler neck during tank refueling activities.

In an illustrative embodiment, a retainer is coupled to an upwardly facing surface on the pivotable flapper door and arranged to mate with the flexible fingers included in the nozzle inhibitor when the flapper door has been moved to assume a normal nozzle passageway-closing position. The retainer is configured to mate with the nozzle inhibitor to retain the flapper door positively in the nozzle passageway-closing position until a large-diameter diesel fuel-dispensing nozzle moves to spread the fingers apart so as to disable the nozzle inhibitor and release the flapper door retainer.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 4 is a view similar to FIG. 3 showing movement of a small-diameter "non-diesel" fuel-dispensing pump nozzle into a filler neck to pivot the outer appearance door about its pivot axis through a first pivot angle to a first opened position and showing engagement of the J-shaped hooks included in the nozzle inhibitor and the tip of the small-diameter nozzle so that further movement of the small-diameter nozzle toward the inner flapper door is blocked before the nozzle can "reach and open" the closed inner flapper door;

FIG. 5 is a partial view similar to FIG. 4 showing use of at least one of the J-shaped hooks in the nozzle inhibitor to block further inward movement of the small-diameter nozzle toward the closed inner flapper door even when the small-diameter nozzle is canted in the filler neck closure assembly;

DETAILED DESCRIPTION

A nozzle inhibitor 10 is adapted to be mounted in a "capless" filler neck as shown in FIGS. 1-7 and in a "capped" filler neck as shown in FIGS. 8-11 to block use of a small-diameter unleaded fuel-dispensing pump nozzle to dispense non-diesel unleaded fuel into a fuel tank of a diesel-engine vehicle. Nozzle inhibitor 10 is configured to allow a user to dispense diesel fuel into such a fuel tank using a large-diameter diesel fuel-dispensing pump nozzle as shown, for example, in FIGS. 7 and 11.

Figure 1:
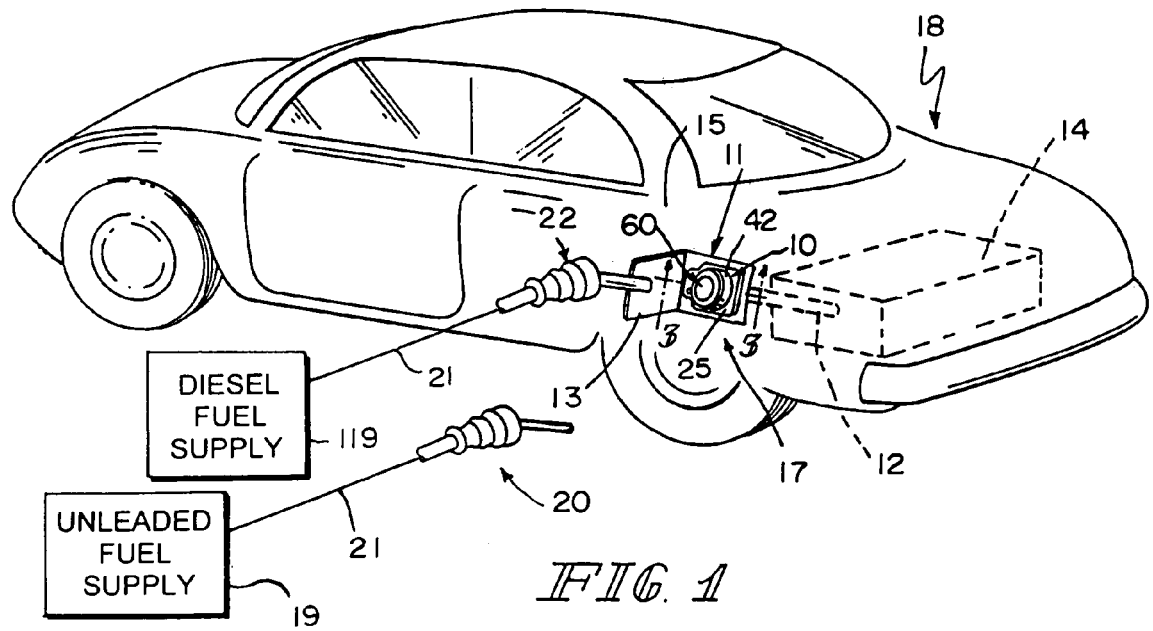
FIG. 1 is a perspective view of a diesel-engine vehicle provided with a "capless" fuel tank filler neck showing an outer filler neck access door moved to an opened position relative to a vehicle body panel to expose an illustrative capless filler neck closure coupled to a filler neck leading to a vehicle fuel tank, showing a large-diameter "diesel" fuel-dispensing pump nozzle coupled to a diesel fuel supply and configured to be inserted into the filler neck closure assembly during vehicle refueling to discharge liquid fuel into the filler neck leading to the vehicle fuel tank, and showing a small-diameter "unleaded" fuel-dispensing pump nozzle that is not authorized for use to refuel the vehicle fuel tank.

A nozzle inhibitor 10 is associated with a capless filler neck 12 coupled to a vehicle fuel tank 14 as suggested in FIG. 1 to prevent a fuel-purchasing customer from using a fuel-dispensing pump nozzle to discharge unleaded fuel into a vehicle 18 having a diesel engine (not shown) requiring only diesel fuel. Nozzle inhibitor 10 is configured to block full insertion of a small-diameter unleaded fuel nozzle 22 into filler neck 12 as suggested in FIGS. 4 and 5. However, nozzle inhibitor 10 is configured to allow full insertion of a relatively large-diameter diesel fuel nozzle 22 into filler neck 12 as suggested in FIGS. 6 and 7.

In an illustrative embodiment, nozzle inhibitor 10 comprises a foundation 101 formed to include a nozzle-receiving aperture 102 and a plurality of flexible fingers or retention arms 103 coupled to foundation 101 at aperture 102. Each finger 103 comprises an inclined cam ramp 104 arranged to engage a tip of large-diameter diesel fuel nozzle 22 during movement of nozzle 22 into aperture 102 and toward filler neck 12 as suggested in FIG. 6. Each finger 103 also comprises a feature such as a hook 105 coupled to inclined cam ramp 104 and arranged to "catch" a tip or diameter of small-diameter unleaded fuel nozzle 20 during movement of nozzle 20 into aperture 102 and toward filler neck 12 as suggested in FIGS. 4 and 5. In the illustrated embodiment, fingers 103 are arranged in spaced-apart relation to one another and coupled to a border edge 106 defining an inlet opening into nozzle-receiving aperture 102. As suggested in FIGS. 4 and 5, "unauthorized" small-diameter nozzles 20 are caught by hooks 105 so that an operator cannot move a small-diameter nozzle 20 into filler neck 12. In contrast, as suggested in FIGS. 6 and 7, "authorized" large-diameter nozzles 22 engage and move inclined cam ramps 104 in radially outward directions to spread fingers 103 apart to provide an opening between fingers 103 that is large enough to allow an operator to move a large-diameter nozzle 22 in an unhindered manner through that opening and into filler neck 12.

As shown in FIG. 1, a capless filler neck closure assembly 11 containing nozzle inhibitor 10 is provided in a vehicle 18 normally to close filler neck 12 extending from fuel tank 14 onboard vehicle 18. During refueling, an outer filler neck access door 13 is moved relative to a vehicle body panel 15 to expose filler neck closure assembly 11 as shown, for example, in FIG. 1. Filler neck closure assembly 11 is located in a chamber 17 formed in vehicle 18 so that assembly 11 is "out of sight" when access door 13 is closed.

Small-diameter nozzle 20 is coupled to an unleaded supply 19 by a hose 21. Large-diameter nozzle 22 is coupled to a diesel fuel supply 119 by a hose 21. In many cases, both nozzles 20, 22 will be available at a filling station. Nozzle inhibitor 10 in filler neck closure assembly 11 in vehicle 18 functions to block a consumer from inadvertently using small-diameter nozzle 20 to discharge unleaded fuel into a fuel tank filler neck 12 of a vehicle that uses only diesel fuel.

Figure 3:
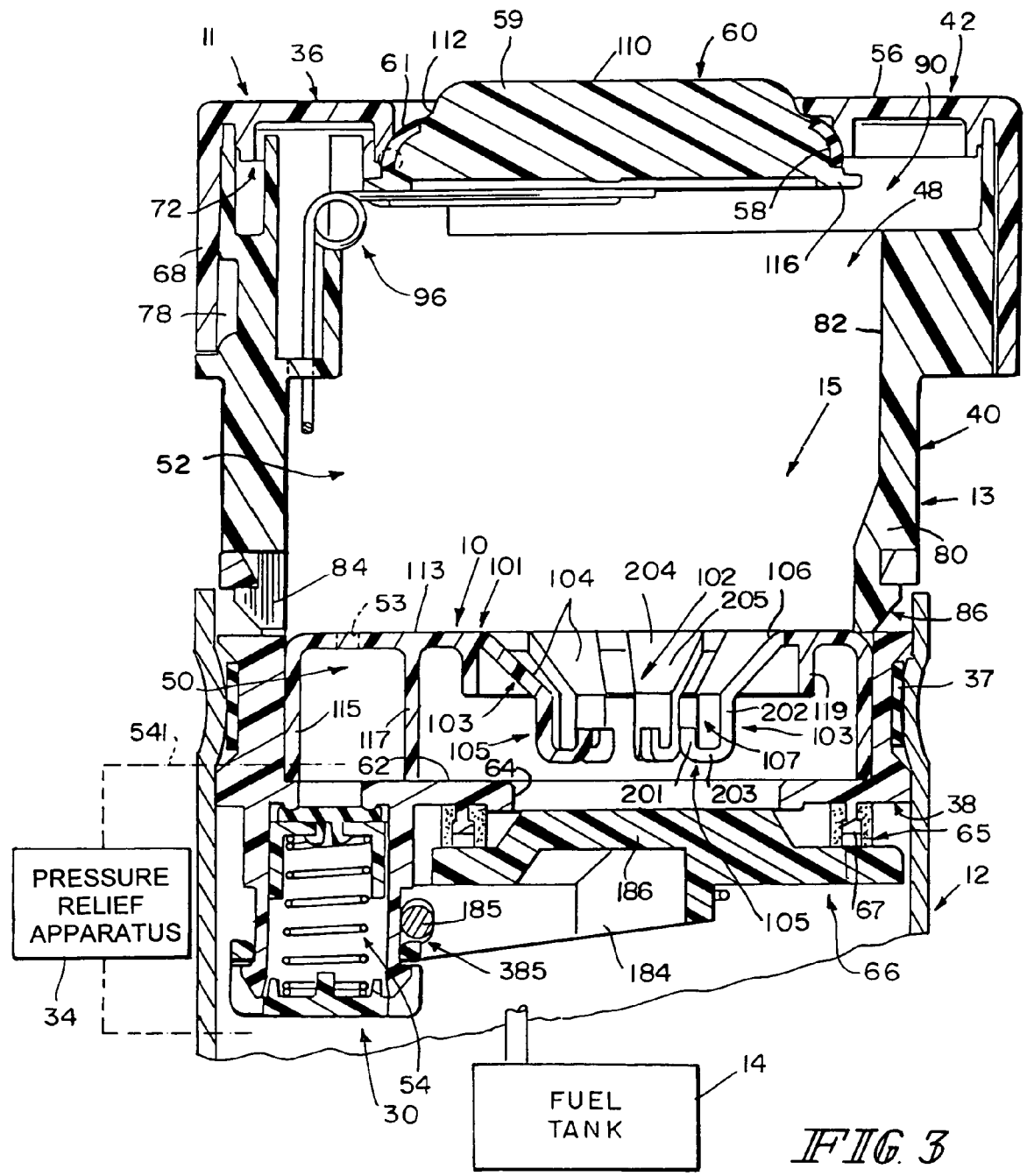
FIG. 3 is a sectional view of the filler neck taken along line 3-3 of FIG. 1 showing an outer appearance door and an inner flapper door in their unpivoted, sealed, closed positions and showing the nozzle inhibitor of FIG. 2 interposed between the outer appearance door and the inner flapper door and provided with a series of J-shaped hooks arranged to limit movement of a small-diameter nozzle in the filler neck as suggested in FIGS. 4 and 5 and with a series of inclined cam ramps coupled to the J-shaped hooks and arranged to be moved by a large-diameter nozzle to disable a nozzle movement-limiting system provided by the J-shaped hooks as suggested in FIGS. 6 and 7.

Filler neck closure assembly 11 is assembled as shown, for example, in FIG. 3. Reference is hereby made to U.S. application Ser. No. 10/895,593, filed on Jul. 21, 2004 and titled "Closure and Vent System for Capless Filler Neck," which application is hereby incorporated by reference herein, for further details about the configuration and function of a suitable filler neck closure assembly 11. In the illustrated embodiment, a vacuum-relief apparatus 30 is included in assembly 11 to provide means for admitting ambient air into filler neck 12 whenever certain predetermined vacuum conditions develop in fuel tank 14 and filler neck 12. A pressure-relief apparatus 34 can be used (alone or with vacuum-relief apparatus 30) to discharge excess pressurized fuel vapor from filler neck 12 through assembly 11 to the surroundings.

Filler neck closure assembly 11 includes a housing 36 configured to contain nozzle inhibitor 10 and adapted to be coupled to a mouth of filler neck 12 in the manner shown, for example, in FIG. 3. A sealing gasket 37 is interposed between housing 36 and filler neck 12 to establish a sealed connection therebetween. In an illustrative embodiment, a fill tube 13 comprises filler neck 12 and housing 36 coupled to filler neck 12 and nozzle inhibitor 10 is located in a passageway 15 formed in fill tube 13 as shown, for example, in FIG. 3.

In the illustrated embodiment, housing 36 comprises a base 38, an outer body 40 coupled to base 38, and an outer shell 42 coupled to outer body 40. Foundation 101 of nozzle inhibitor 10 is mounted, for example, in a cavity formed in base 38 to lie in an interior region or outer passageway 48 formed in housing 36 between base 38 and outer body 40. Foundation 101 is arranged as shown, for example, in FIG. 3 to divide interior region 48 into an inner vent chamber 50 below foundation 101 and an outer vent chamber 52 above foundation 101. Foundation 101 and base 38 cooperate to form channel means 53 for conducting air and/or fuel vapor between inner and outer vent chambers 50, 52 while foundation 101 is mounted in interior region 48 to define inner and outer chambers 50, 52. Foundation 101 is arranged to shield components defining vacuum-relief apparatus 30 and pressure-relief apparatus 34 from any contaminant material inadvertently introduced into outer vent chamber 52.

As suggested in FIG. 3, housing 36 also includes a vent passage 54 and/or 54' having an outer end opening into inner vent chamber 50 located in interior region 48 and an inner end adapted to open into fuel tank filler neck 12 when housing 36 is coupled to filler neck 12. A flow control valve assembly such as a vacuum-relief apparatus 30 or pressure-relief apparatus 34 can be placed in vent passage 54 or 54' to regulate flow of a gas (e.g., air or fuel vapor) through vent passage 54 of 54'.

Housing 36 is adapted to be coupled to fuel tank filler neck 12 to receive a fuel-dispensing pump nozzle during refueling of fuel tank 14. Housing 36 includes a top wall 56 provided, for example, on outer shell 42 and formed to include an outer nozzle-receiving aperture 58 normally closed by outer closure 60. Outer closure 60 can be moved (e.g., pivoted) by a pump nozzle of any size to assume an opened position during refueling as suggested in FIGS. 4 and 6. Housing 36 also includes a bottom wall 62 provided, for example, on base 38 and formed to include an inner nozzle-receiving aperture 64 normally closed by a flapper door 66. Flapper door 66 is arranged to be moved (e.g., pivoted) by large-diameter pump nozzle 22 to assume an opened position during refueling as suggested in FIG. 7.

Figure 6:
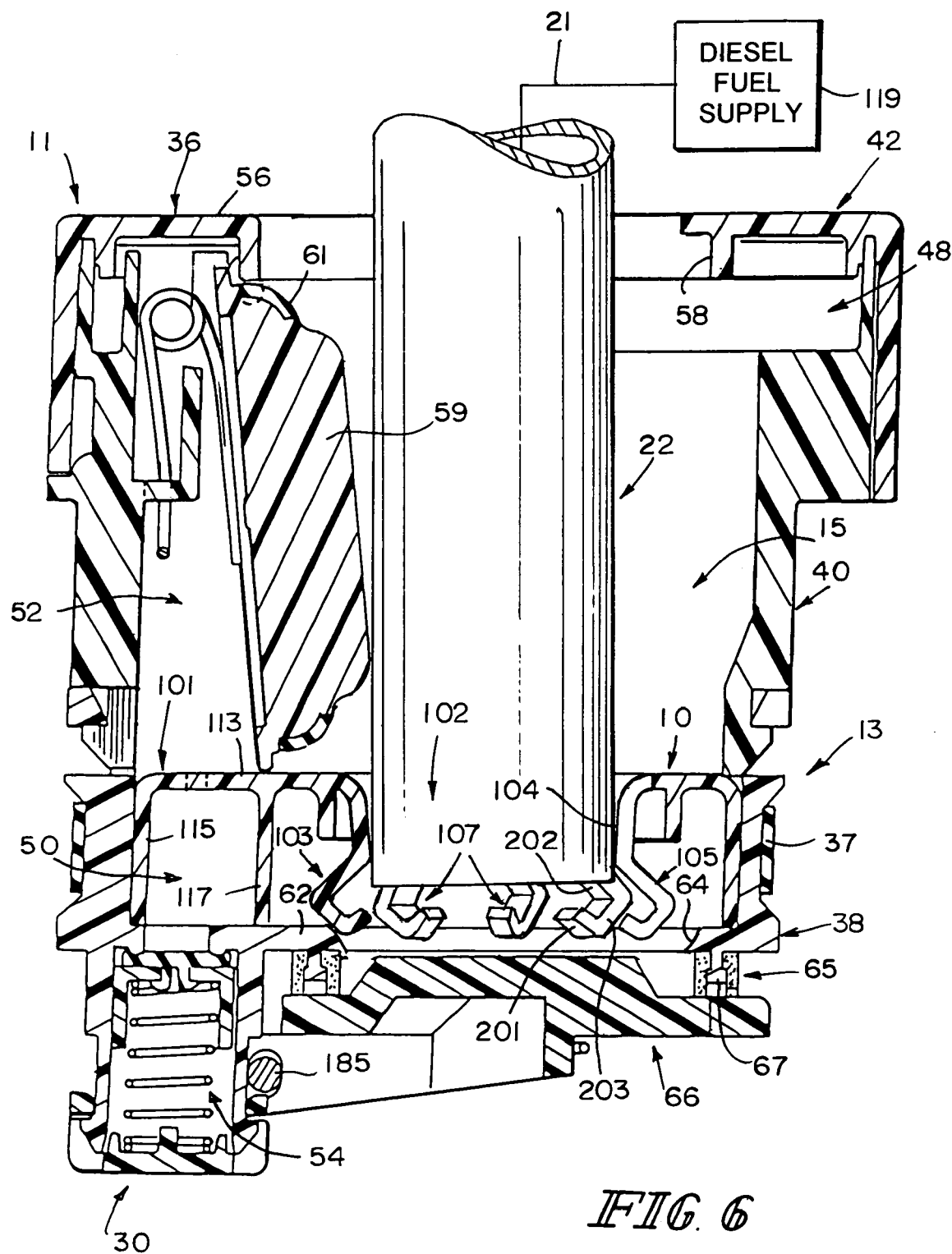
FIG. 6 is a view similar to FIGS. 3-5 showing movement of a large-diameter "diesel" fuel-dispensing pump nozzle into the filler neck to pivot the outer appearance door further about its pivot axis through a larger second pivot angle to a second opened position and to engage and ride on the inclined cam ramps included in the nozzle inhibitor to cause all of the J-shaped hooks in the nozzle inhibitor to move in radially outward directions out of the path of the nozzle so that further movement of the large-diameter nozzle toward the inner flapper door is permitted.
Figure 7:
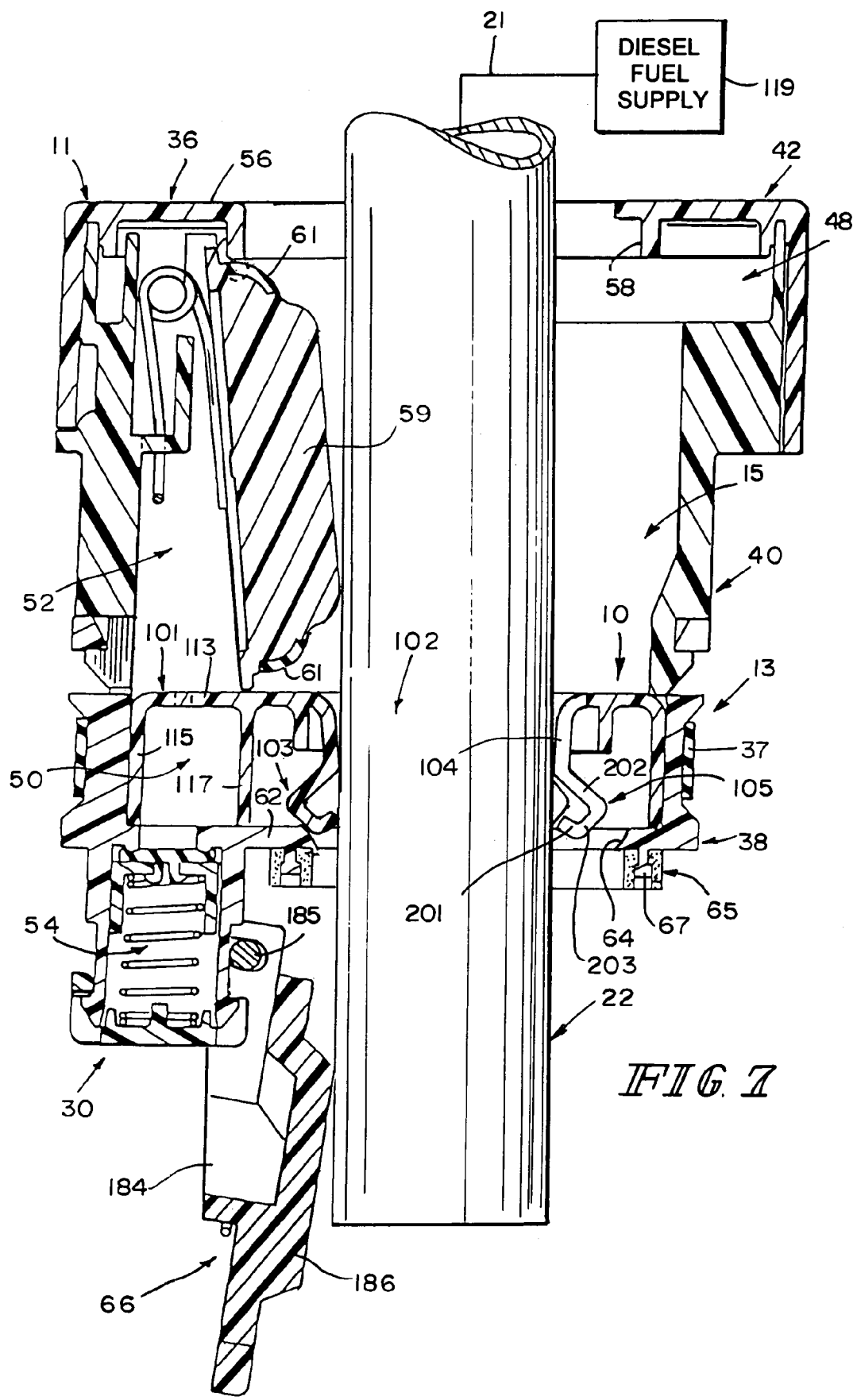
FIG. 7 is a view similar to FIG. 6 showing movement of the tip of the large-diameter nozzle past the nozzle inhibitor to pivot the inner flapper door about its pivot axis to assume an opened position.

As suggested in FIGS. 4 and 6, outer closure 60 includes an appearance door 59 mounted for pivotable movement relative to outer body 40 and configured to carry a seal member 61. When outer closure 60 is moved to assume the closed position, appearance door 59 occludes outer nozzle-receiving opening 58 and seal member 61 establishes a sealed connection between top wall 56 of outer shell 42 and appearance door 59.

As also suggested in FIG. 3, an annular seal 65 is configured to mate with flapper door 66 upon movement of flapper door 66 to assume the closed position. Seal retainer 67 is coupled to base 38 to retain annular seal 65 in a position surrounding inner nozzle-receiving opening 64 and engaging flapper door 66 upon movement of flapper door 66 to assume the closed position.

Foundation 101 of nozzle inhibitor 10 is arranged to divide interior region of 48 into outer and inner vent chambers 52, 50. Outer vent chamber 52 communicates with both outer and inner nozzle-receiving apertures 58, 64 as suggested in FIG. 3. Outer vent chamber 52 also defines a pump nozzle-receiving passageway adapted to receive pump nozzle 20 or 22 therein as suggested in FIGS. 4 and 6 during movement of the pump nozzle through outer and inner nozzle-receiving apertures 58, 64 to move outer closure 60 and, in the case of large-diameter pump nozzle 22, flapper door 66 to opened positions during fuel tank refueling. Inner vent chamber 50 communicates with vent passages 54, 54' as suggested in FIG. 3. Inner vent chamber 50 also communicates with outer vent chamber 52 via suitable channel means 53.

Outer shell 42 includes an annular skirt 68 coupled to top wall 56. Means 72 is appended to an underside of top wall 56 for coupling outer shell 42 to outer body 40.

Outer body 40 includes an outer side wall 78 sized to fit in and mate with annular skirt 68 of outer shell 42, a lower rim 80 including an annular inner side wall 82 extending upwardly toward top wall 56 of outer shell 42, several small fasteners 84 extending downwardly from lower rim 80, and one large fastener 86 extending downwardly from lower rim 80 as suggested in FIG. 3. A spaced-apart pair of pivot mounts is coupled to annular inner side wall 82 and arranged to extend into a cavity 90 formed in outer body 40 to support pivot arms appended to appearance door 59 so that appearance door 59 is able to pivot about a pivot axis extending through pivot arms as appearance door 59 moves between opened and closed positions. A spring mount is also provided in a cavity 90 of outer body 40 and located midway between the pivot mounts to receive a portion of a torsion spring 96 provided to bias outer closure 60 normally to assume the closed position.

Appearance door 59 in an illustrative embodiment is made of a plastics material and includes a round top wall 110, an annular upright wall 112 depending from a perimeter edge of top wall 110 and formed to include a plurality of circumferentially spaced-apart tether-receiving holes, and an annular lateral wall 116 extending radially outwardly from a perimeter edge of annular upright wall 112. Seal member 61 is over-molded onto appearance door 59 to produce outer closure 60 in the illustrated embodiment.

Figure 2:
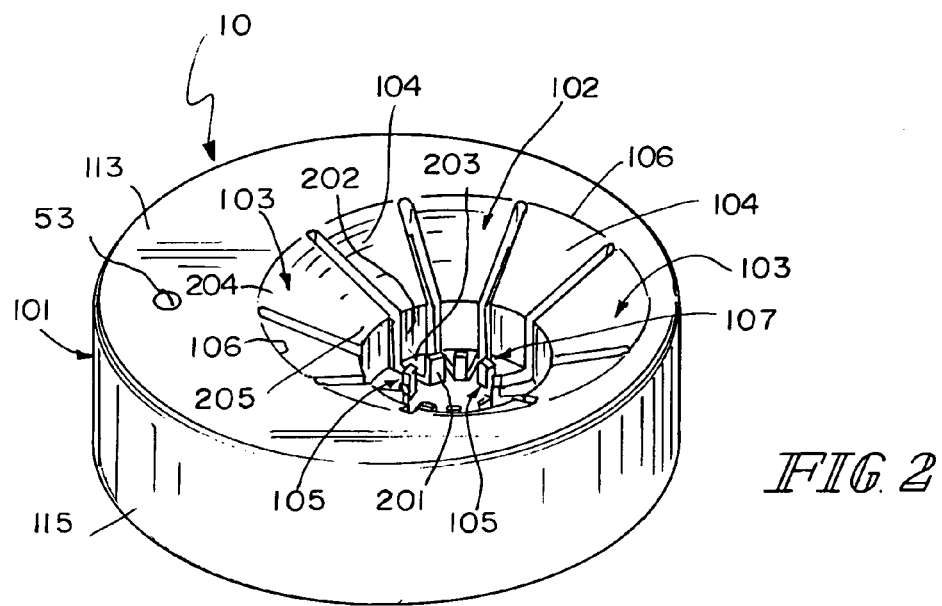
FIG. 2 is an enlarged perspective view of an outer portion of the filler neck closure assembly of FIG. 1 showing an illustrative fuel-dispensing pump nozzle inhibitor in accordance with the present disclosure.

As suggested in FIGS. 2 and 3, each hook 105 in nozzle inhibitor 10 is J-shaped and has an upper portion appended to a lower portion of a companion inclined cam ramp 104. An L-shaped hook (see FIG. 12) could also be included in nozzle inhibitor 10 instead of a J-shaped hook 105. Each hook 105 is formed to include a channel 107 that cooperates with channels 107 in other hooks 105 to define channel means for receiving the tip (or a portion of the tip) of small-diameter nozzle 20 therein as suggested in FIGS. 4 and 5 to limit further movement of small-diameter nozzle 20 into or toward filler neck 12 during vehicle refueling. The illustrated channel means is ring-shaped as suggested in FIG. 2. Each J-shaped hook 105 in the illustrated embodiment includes a short upright tang 201, a longer upright arm 202 appended to a companion inclined cam ramp 104, and a lateral connector 203 interconnecting tang 201 and arm 202.

As also suggested in FIGS. 2 and 3, each inclined cam ramp 104 is a conic section and has a wider portion 204 appended to foundation 101 at border edge 106 and a narrow portion 205 appended to upright arm 202 of a companion hook 105. Border edge 106 is circular in the illustrated embodiment. In an illustrative embodiment, nozzle inhibitor 10 is a monolithic element made of a suitable elastic material to allow fingers 103 to flex and recover their shape as suggested in FIGS. 3-7. It is within the scope of this disclosure to make nozzle inhibitor 10 from a plastics materials as shown or from a suitable metal.

Foundation 101 includes a round top wall 113 formed to include border edge 106 and an annular side wall 115 appended to a perimeter edge of round top wall 113. One or more stabilizers 117 is appended to an underside of round top wall 113 as suggested in FIG. 3. Side wall 115 and stabilizer(s) 117 mate with portions of base 38 of housing 36 to locate flexible fingers 103 in a region confronting inner nozzle-receiving aperture 64 as suggested in FIG. 3. Fingers 103 are arranged to lie in circumferentially spaced-apart relation to one another along border edge 106 and deflect in radially inward and outward directions relative to a central axis 111 passing through the opening defined by border edge 106. An annular inner wall 119 is arranged to depend from top wall 113 and surround inclined cam ramps 104 of fingers 103 as suggested in FIG. 3.

It is within the scope of this disclosure to form some portion of foundation 101 or base 38 to include vent channel means 53. In the illustrated embodiment, top wall 113 is formed to include vent channel means 53. A series of spaced-apart notches (not shown) which cooperate to define vent channel means 53 for allowing flow of air and/or fuel vapor between inner and outer vent chambers 50, 52 can be provided.

As shown in FIG. 3, annular seal 65 is arranged to contact flapper door 66 upon movement of flapper door 66 to the closed position to establish an annular seal between housing 36 and flapper door 66. Flapper door 66 includes pivot arms 184 mounted to pivot on a pivot shaft 185 associated with base 38, a raised dome 186 including a top wall facing toward a bottom wall 62 of base 38 and an annular side wall extending a direction away from bottom wall 62, and a dome support interposed between pivot arms 184 and raised dome 186. Annular seal 65 is gripped by seal retainer 67. An inclined nozzle-engaging surface (not shown) can be appended to raised dome 186 to contact pump nozzle 22 during opening of flapper door 66. A torsion spring (not shown) is provided to bias flapper door 66 normally and yieldably to the closed position shown in FIG. 3.

Base 38 of housing 36 includes first and second shaft mounts 385 as shown, for example, in FIG. 3. Each shaft mount 385 is adapted to be coupled to pivot shaft 185 to support pivot shaft 185 for movement relative to shaft mounts 385.

Owing to the modularity of nozzle inhibitor 10, assembly 11 can be configured easily to accept small-diameter unleaded fuel-dispensing pump nozzles 20 or larger-diameter diesel fuel-dispensing pump nozzles 22. Assembly 11 can be adapted to work with either style of pump nozzle by manufacturing assembly 11 to include a foundation 101 configured to work with the desired style of pump nozzle. During manufacture, the foundation is selected from a group comprising a first foundation (not shown) formed without fingers 103 and associated with a small-diameter unleaded fuel-dispensing pump nozzle 20 and a second foundation 101 including fingers 103 and associated with a larger-diameter diesel fuel-dispensing pump nozzle 22.

Filler neck closure assembly 11 is shown in FIGS. 1 and 3 just before a pump nozzle operator begins to pump fuel into fuel tank filler neck 12. Nozzle inhibitor 10 is provided in filler neck closure assembly 11 to block that operator from pumping unleaded fuel into a fuel tank in a vehicle having a diesel engine.

Outer appearance door 59 and an inner flapper door 66 are biased to assume their unpivoted, sealed, closed positions. Nozzle inhibitor 10 is interposed between outer appearance door 59 and inner flapper door 66. Nozzle inhibitor 10 is provided with fingers 103 carrying hooks 105 arranged to limit movement of a small-diameter unleaded fuel nozzle 20 in filler neck 12 as suggested in FIGS. 4 and 5. Fingers 103 also include inclined cam ramps 104 that are arranged to be moved in radially outward direction by a large-diameter diesel fuel nozzle 22 to "disable" hooks 105 in fingers 103 as suggested in FIGS. 6 and 7.

Movement of a small-diameter "non-diesel" fuel nozzle 20 into a filler neck 12 to pivot outer appearance door 69 about its pivot axis through a first pivot angle to a first opened position is shown, for example, in FIG. 4. Hooks 105 are located in the "path" of nozzle 20 to engage the tip of nozzle 20 so that further movement of nozzle 20 toward inner flapper door 66 is blocked.

Movement of a large-diameter diesel fuel nozzle 22 into filler neck 12 to pivot outer appearance door 59 further about its pivot axis through a larger second pivot angle to a second opened position is shown, for example, in FIG. 6. The tip of nozzle 22 moves inclined cam ramps 104 relative to one another to move hooks 105 out of the path of nozzle 22 so that further movement of nozzle 22 toward inner flapper door 66 is permitted.

Nozzle inhibitor 10 is located in a passageway 15 formed in fill tube 13 and configured to include fingers 103 arranged to lie in circumferentially spaced-apart relation to one another to contact a tip of any fuel-dispensing nozzle inserted into fill tube 13 and moved inwardly in passageway 15 to contact nozzle inhibitor 10. Each finger 103 includes a hook 105 arranged to catch a tip of a small-diameter unleaded fuel-dispensing nozzle 20 having a first diameter to block further inward movement of small-diameter unleaded fuel-dispensing nozzle 20 in passageway 15 of fill tube 13. Each finger 103 also includes an inclined cam ramp 104 arranged to engage a tip of only a large-diameter diesel fuel-dispensing nozzle 22 having a relatively larger second diameter that is moving inwardly in passageway 15 of fill tube 13 to spread fingers 103 to allow movement of large-diameter diesel fuel-dispensing nozzle 22 past fingers 103 and through a widened nozzle-receiving opening provided between fingers 103 as shown, for example, in FIGS. 6 and 7 further inwardly into passageway 15 of fill tube 13.

Foundation 101 is mounted in passageway 15 of fill tube 13 and fingers 103 are mounted to foundation 101 for movement relative to foundation 101 as suggested, for example, in FIGS. 3-6. Fingers 103 are coupled to foundation 101 at border edge 106.

Hooks 105 are located in passageway 15 formed in fill tube 13 as suggested in FIGS. 3-6. Hooks 105 cooperate to define means for limiting inward movement of small-diameter unleaded fuel nozzle 20 into passageway 15 of fill tube 13. Cam ramps 104 are located in passageway 15 formed in fill tube 13. Cam ramps 104 cooperate to define means for spreading hooks 105 apart upon engagement with large-diameter diesel fuel nozzle 22 to create a widened nozzle-receiving opening between hooks 105 to allow movement of large-diameter diesel fuel nozzle 22 past hooks 105 and through the widened nozzle-receiving opening further inwardly into passageway 15 of fill tube 13. Each hook 105 and a companion one of cam ramps 104 cooperate to define a finger 103.

Figure 8:
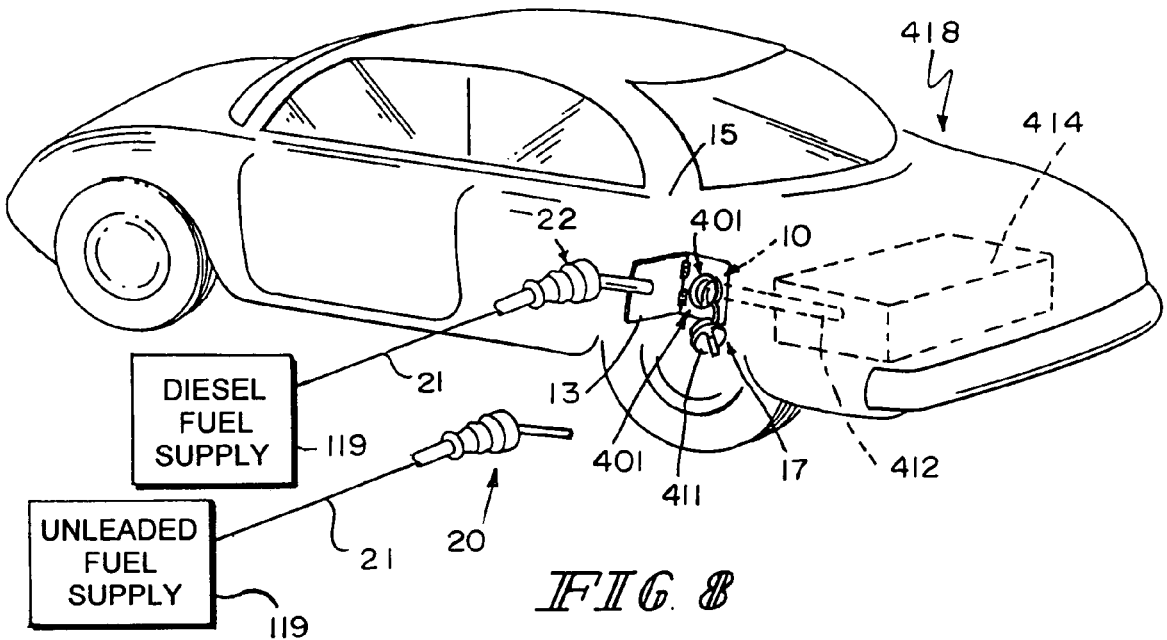
FIG. 8 is a perspective view similar to FIG. 1 of a diesel-engine vehicle provided with a "capped" fuel tank filler neck.

Nozzle inhibitor 10 is associated with a capped filler neck 412 coupled to a vehicle fuel tank 414 as suggested in FIG. 8 to prevent a fuel-purchasing customer from using small-diameter unleaded fuel-dispensing pump nozzle 20 to discharge unleaded fuel into a vehicle 418 having a diesel engine (not shown) requiring only diesel fuel. Nozzle inhibitor 10 is configured to block full insertion of a small-diameter nozzle 20 into filler neck 412 as suggested in FIG. 10. However, nozzle inhibitor 10 is configured to allow full insertion of a relatively large-diameter diesel fuel nozzle 22 into filler neck 412 as suggested in FIG. 11.

Figure 9:
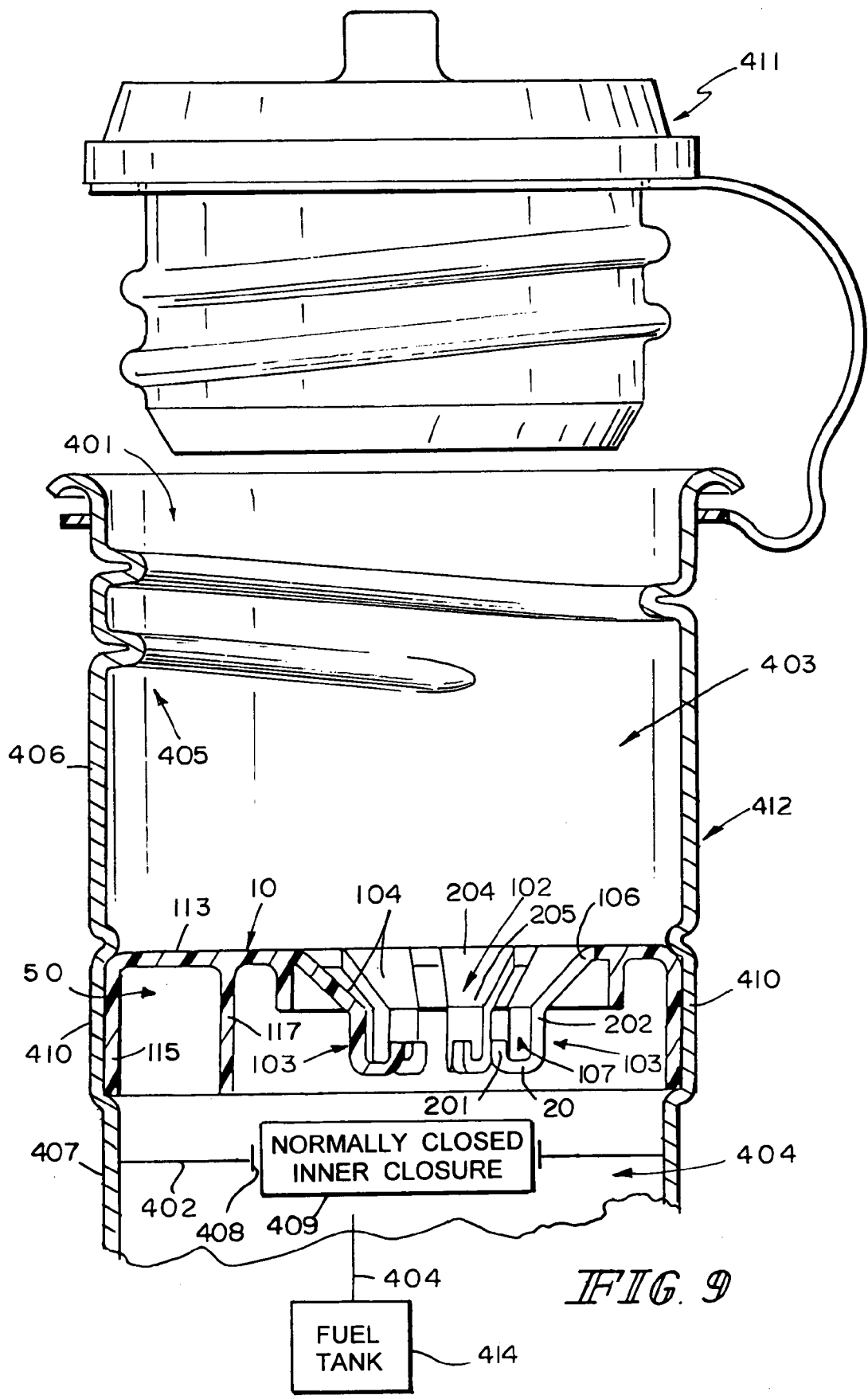
FIG. 9 is a sectional view similar to FIG. 3 of the fuel tank filler neck of FIG. 8 showing the nozzle inhibitor of FIG. 2 in a location in an outer passageway formed in the filler neck between an open mouth into the outer passageway and a normally closed inner closure mounted on a partition located between the outer passageway and a fuel-conducting passageway leading to the fuel tank for movement relative to an aperture formed in the partition between an aperture-opening position and an aperture-closing position.

As suggested in FIGS. 8 and 9, a closure or cap 411 is provided to close an open mouth 401 into filler neck 412. During refueling, an outer filler neck access door 13 is moved relative to a vehicle body panel 15 to expose cap 411 as shown, for example, in FIG. 8. Cap 411 is coupled normally to filler neck 412 and located in a chamber 17 formed in vehicle 418 so that cap 411 is out of sight when access door 13 is closed.

In an illustrative embodiment suggested in FIG. 9, a partition 402 is provided in filler neck 412 to define an outer passageway 403 communicating with open mouth 401 and a fuel-conducting passageway 404 leading to fuel tank 414. Outer passageway 403 extends from open mouth 401 to partition 402. Suitable means 405 (e.g., threads or retainer flanges) are provided on an outer portion 406 of filler neck 412 defining outer passageway 403 for retaining cap 411 in mating engagement with outer portion 406 to close open mouth 401. Fuel-conducting passageway 404 extends in an inner portion 407 of filler neck 412 from partition 402 to fuel tank 414.

Partition 402 is formed to include an aperture 408 and a normally closed inner closure 409. Aperture 408 is sized to allow large-diameter nozzle 22 to pass therethrough to reach fuel-conducting passageway 404 as illustrated in FIG. 11. Inner closure 409 is mounted for movement between an aperture-closing position shown diagrammatically in FIGS. 9 and 10 and an aperture-opening position suggested diagrammatically in FIG. 11.

Figure 10:
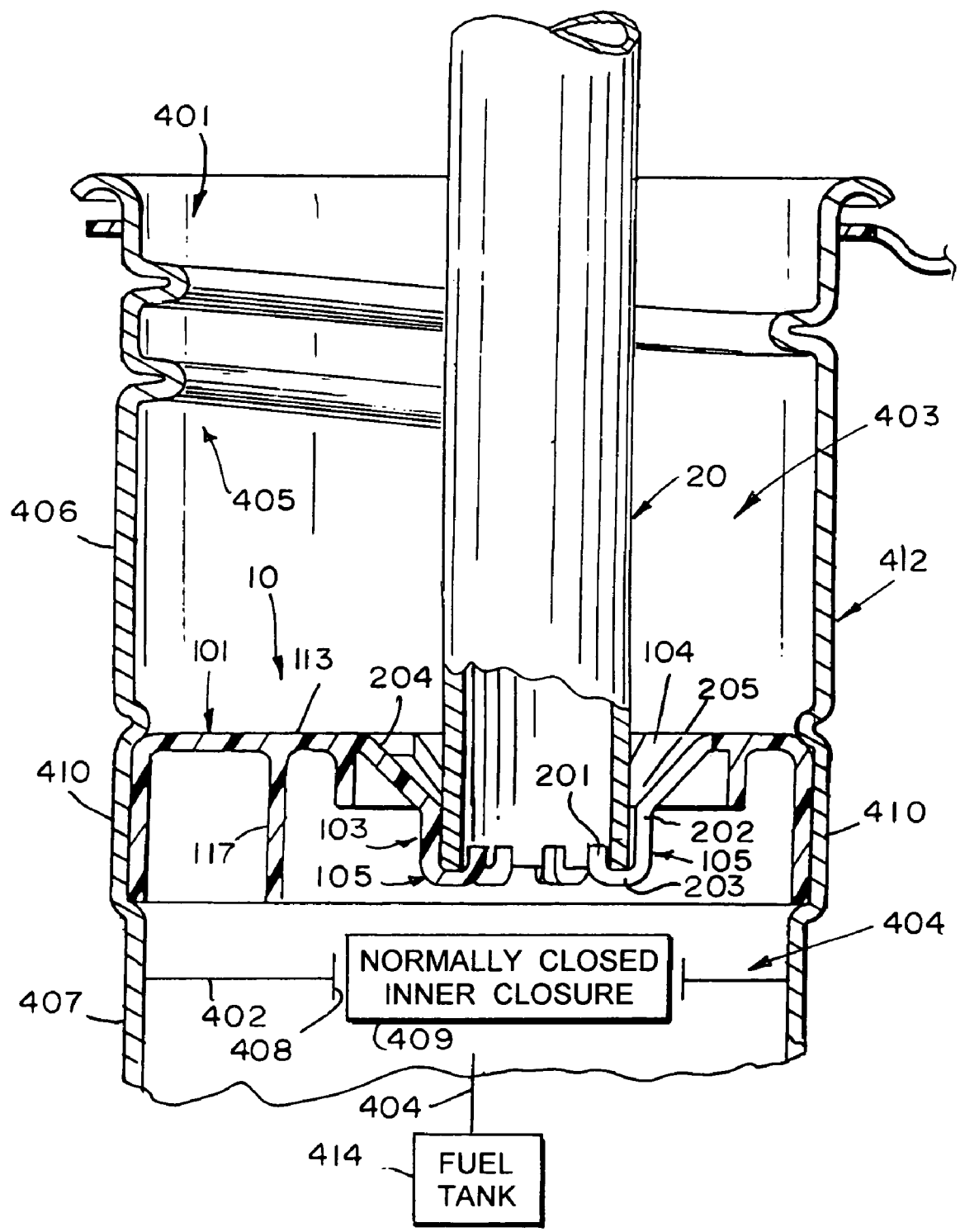
FIG. 10 is a view similar to FIG. 9 showing movement of a small-diameter "non-diesel" fuel-dispensing pump nozzle into an outer passageway formed in a filler neck to engage a tip of that nozzle with J-shaped hooks included in the nozzle inhibitor so that further movement of the small-diameter nozzle toward the normally closed inner closure is blocked before the small-diameter nozzle can "reach" and move that inner closure to an opened position.
Figure 11:
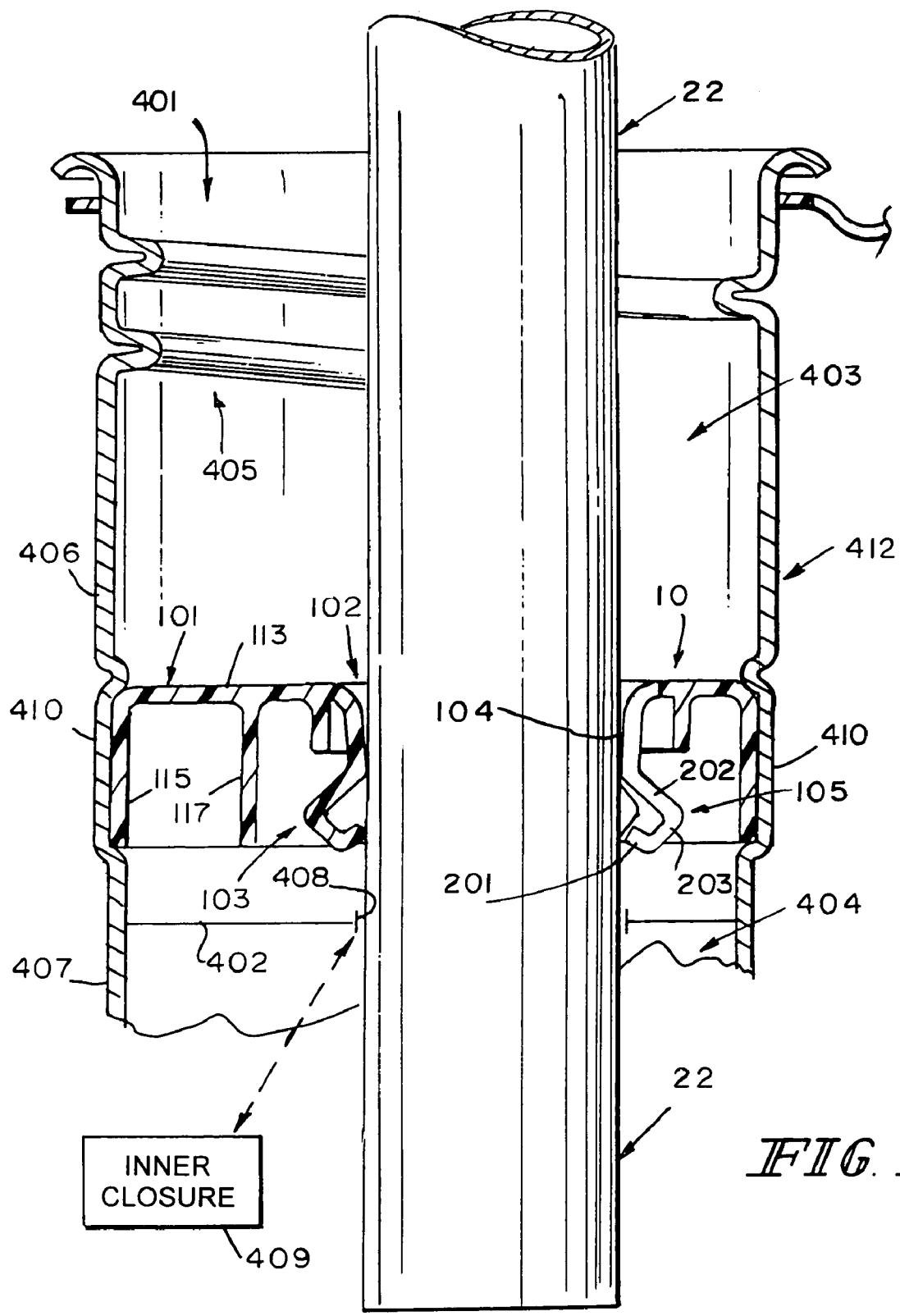
FIG. 11 is a view similar to FIGS. 9 and 10 showing movement of the tip of a large-diameter diesel fuel-dispensing pump nozzle past a disabled nozzle inhibitor to move the inner closure to assume an opened position and allow movement of the large-diameter nozzle through the aperture formed in the partition underlying the nozzle inhibitor to reach the fuel-conducting passageway leading to the fuel tank.

An inhibitor mount 410 is provided in outer portion 406 of filler neck 412 to mount nozzle inhibitor 10 in a fixed position in outer passageway 403 as shown, for example, in FIGS. 9-11. In the illustrated embodiment, nozzle inhibitor 10 is located in close proximity to partition 402 and arranged to align aperture 102 of nozzle inhibitor 10 with aperture 408 of partition 402. Such alignment allows movement of large-diameter nozzle 22 through both apertures 102, 408 simultaneously as shown in FIG. 11. Nozzle inhibitor 10 is mounted in inhibitor mount 410 to block a consumer from inadvertently using small-diameter nozzle 20 to discharge unleaded fuel into fuel-conducting passageway 404 and fuel tank 414 of diesel-engine vehicle 418.

Filler neck 412 is shown in FIG. 8 just before a pump nozzle operator begins to pump fuel into filler neck 412. Removal of cap 411 from filler neck 412 is illustrated in FIG. 9.

Movement of a small-diameter "non-diesel" fuel nozzle 20 into outer passageway 403 of filler neck 412 is shown in FIG. 10. Hooks 105 of nozzle inhibitor 10 are located in the "path" of nozzle 20 to engage the tip of nozzle 20 so that further movement of nozzle 20 toward normally closed inner closure 409 coupled to partition 402 is blocked.

Movement of a large-diameter diesel fuel nozzle 22 into outer passageway 403 of filler neck 412 is shown in FIG. 11. The tip of nozzle 22 moves inclined cam ramps 104 relative to one another to move hooks 105 out of the path of nozzle 22 so that movement of nozzle 22 to engage and open inner closure 409 and extend into fuel-conducting passageway 404 is permitted. Once nozzle 72 is deployed as shown in FIG. 11, an operator can use nozzle 22 to dispense diesel fuel into fuel-conducting passageway 404 and diesel fuel tank 414.

A retainer 500 is provided to link inner flapper door 66 to nozzle inhibitor 10' upon movement of inner flapper door 66 to assume a closed position as suggested, for example, in the embodiment of FIGS. 12-16. In the illustrated embodiment, retainer 500 is coupled to an upwardly facing portion of flapper door 66 and includes an enlarged head 501 arranged to overlie distal portions 503 of hooks 504 and a throat 502 arranged to interconnect enlarged head 501 and flapper door 66.

Figure 14:
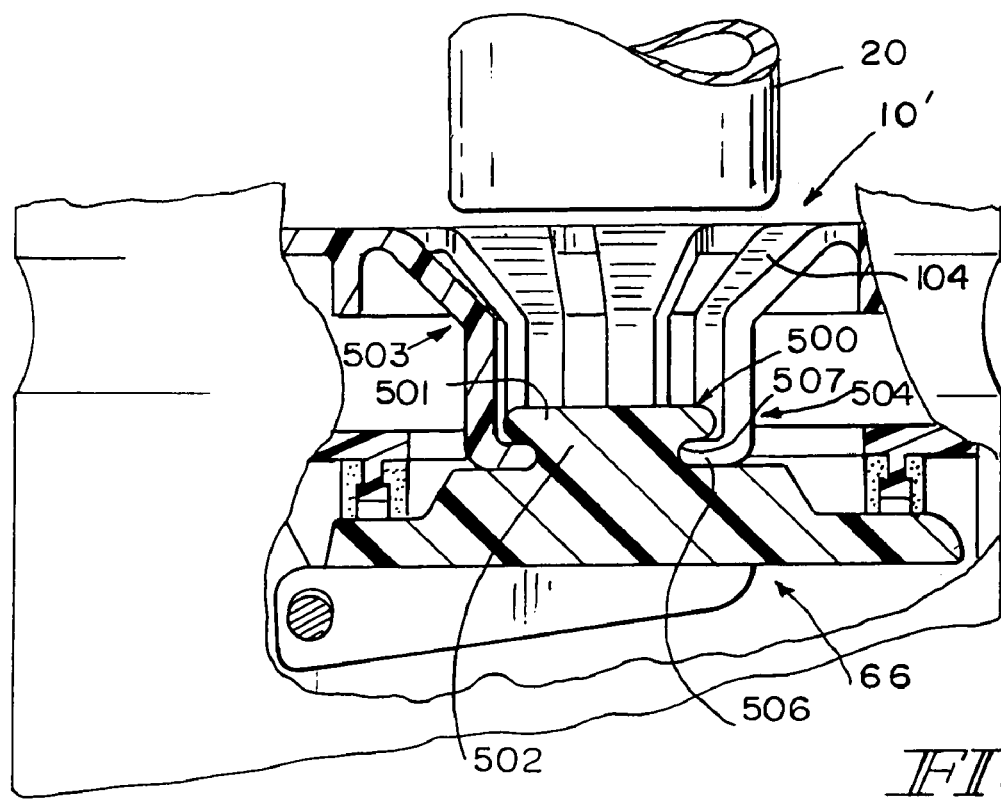
FIG. 14 is a view similar to FIGS. 12 and 13 showing a tip of a large-diameter diesel fuel-dispensing pump nozzle moving downwardly in the filler neck toward the nozzle inhibitor and the retainer linking the inner flapper door to the nozzle inhibitor.
Figure 15:
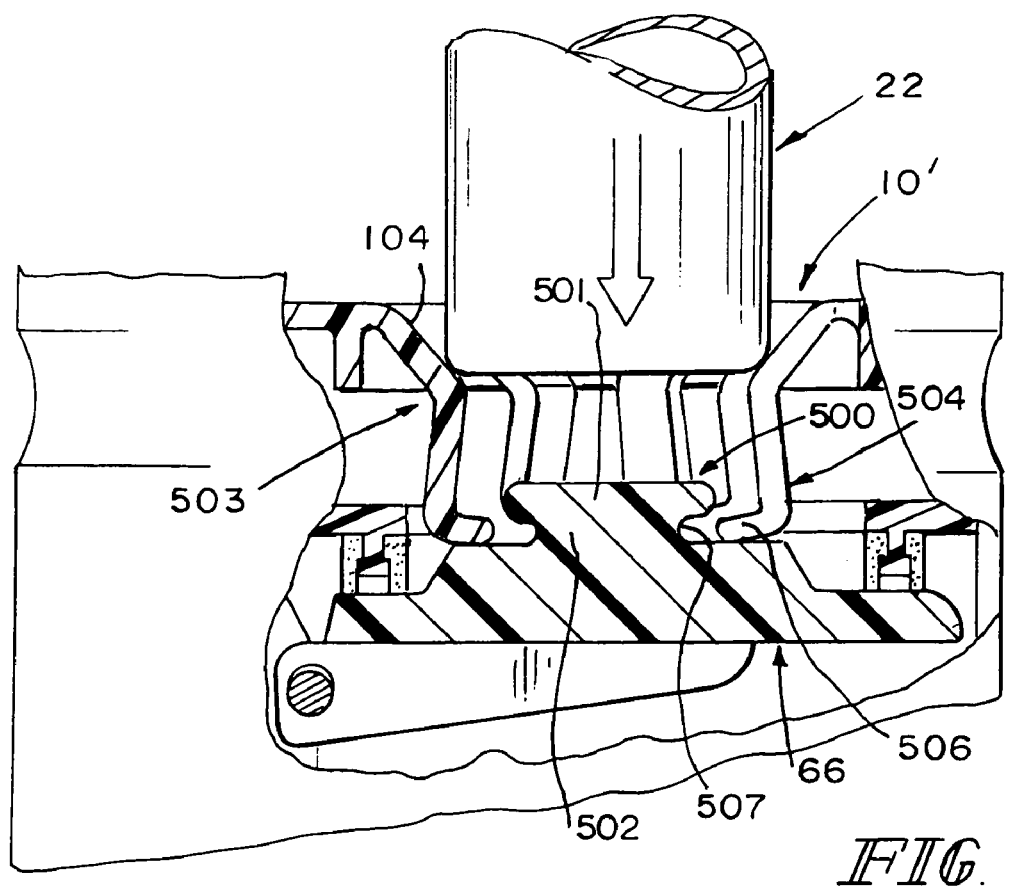
FIG. 15 is a view similar to FIGS. 12-14 showing movement of a large-diameter diesel fuel-dispensing pump nozzle into the filler neck to engage and ride on inclined cam ramps included in the nozzle inhibitor to cause all of the J-shaped hooks in the nozzle inhibitor to move in radially outward directions out of the path of the nozzle so that (1) the retainer coupled to the flapper door is "released" from engagement with the fingers, thus freeing the flapper door to pivot about an axis to an opened position and (2) further movement of the large-diameter nozzle through the nozzle inhibitor toward the inner flapper door is permitted.
Figure 16:
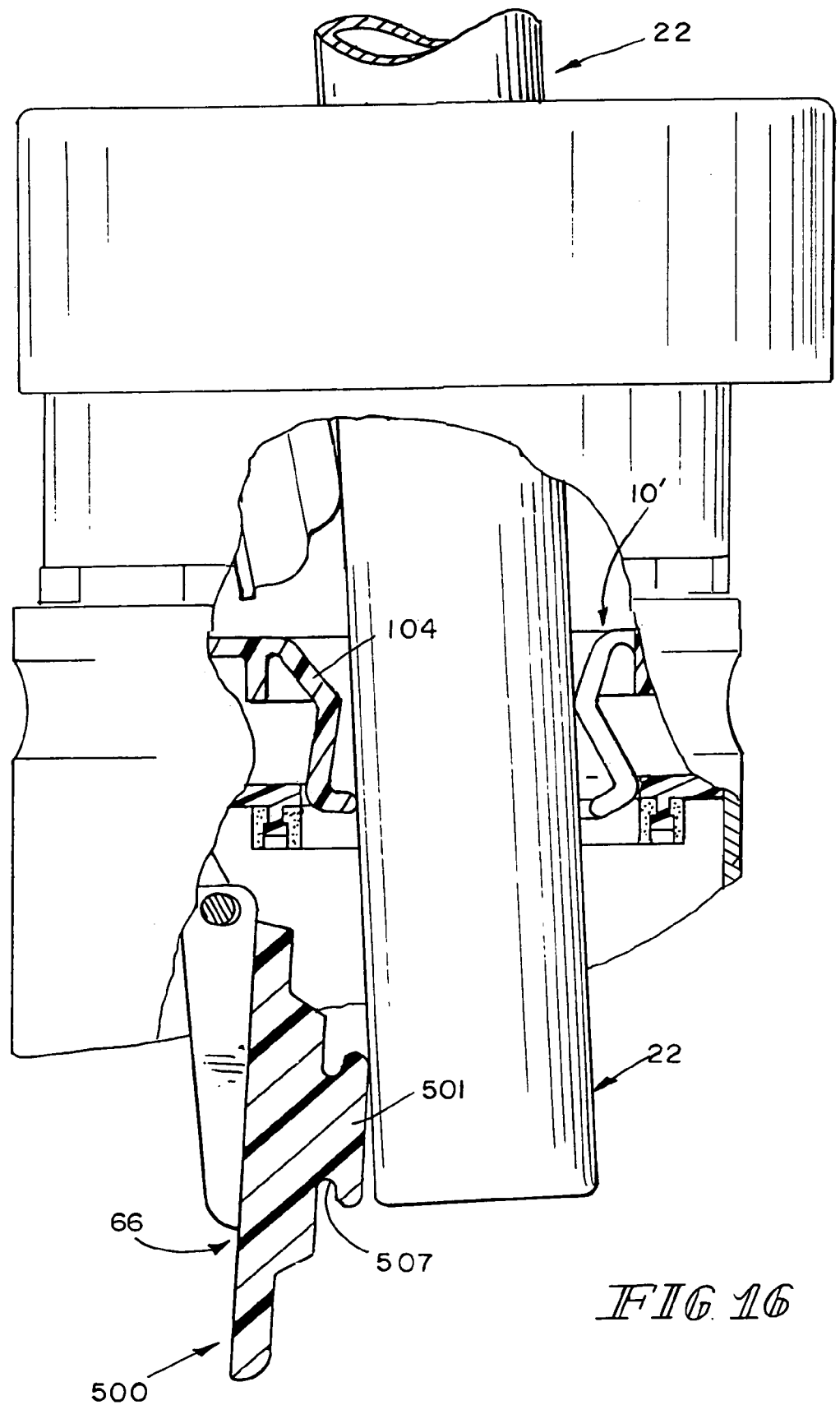
FIG. 16 is a view similar to FIGS. 12-15 showing movement of the tip of the large-diameter nozzle past the nozzle inhibitor to pivot the inner flapper door about its pivot axis to assume an opened position and move the retainer carried on the inner flapper door away from the nozzle inhibitor.

In an illustrative embodiment, nozzle inhibitor 10' includes fingers 503 that include means for gripping retainer 500 upon movement of inner flapper door 66 to the closed position and fingers 503 to a closed position as shown, for example, in FIG. 14 until fingers 503 are moved to assume a spread position as shown, for example, in FIG. 15 to release retainer 500. Once retainer 500 is released, inner flapper door 66 can be pivoted to an opened position as shown, for example, in FIG. 16. In an illustrative embodiment hooks 504 cooperate to define the gripping means.

Figure 12:
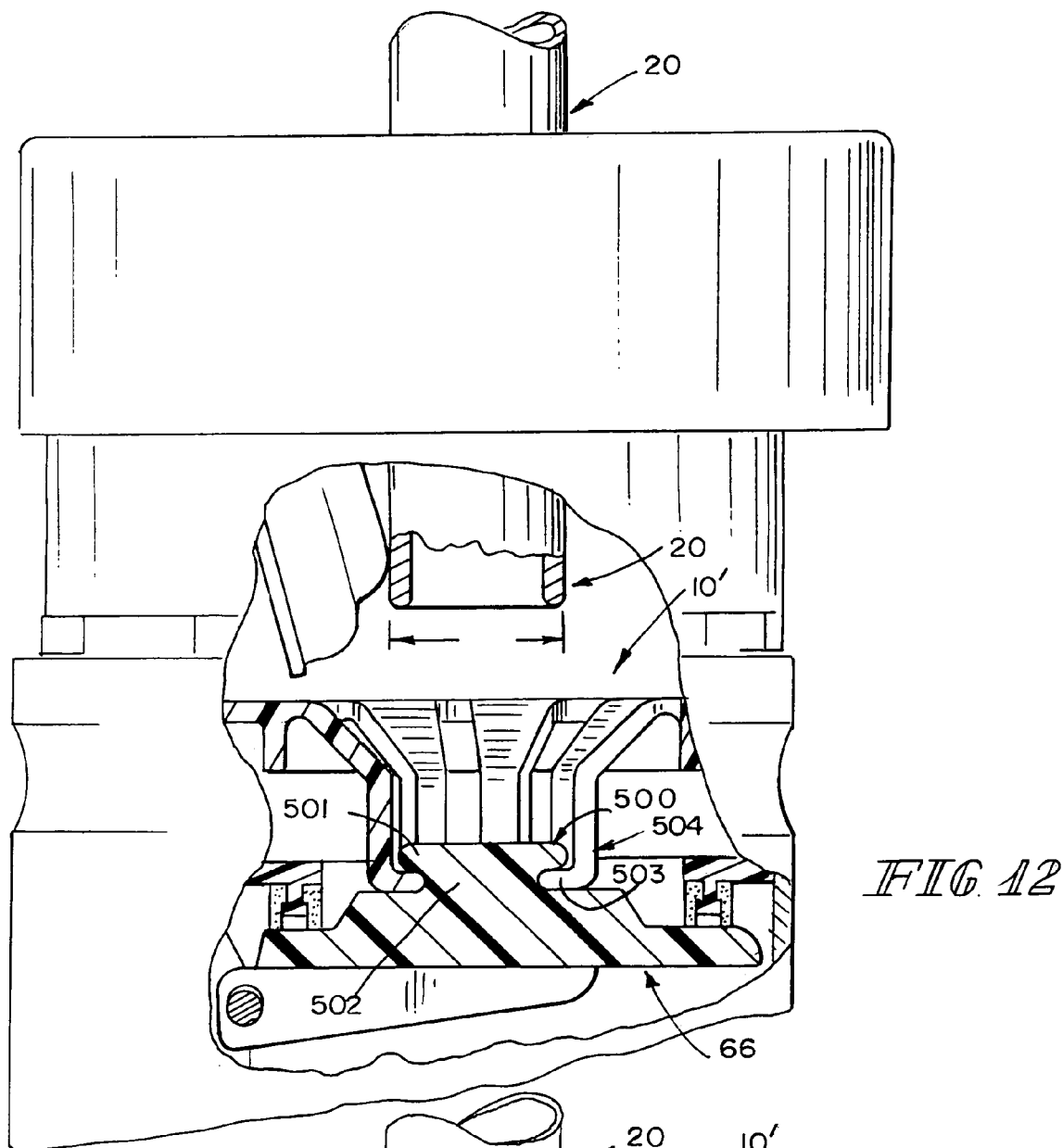
FIG. 12 is a partial sectional view similar to FIG. 3 of a capless filler neck showing an inner flapper door in an unpivoted, sealed, closed position and showing a retainer coupled to the inner flapper door and mated to fingers included in the nozzle inhibitor to retain the inner flapper door temporarily in the unpivoted, sealed, closed position.
Figure 13:
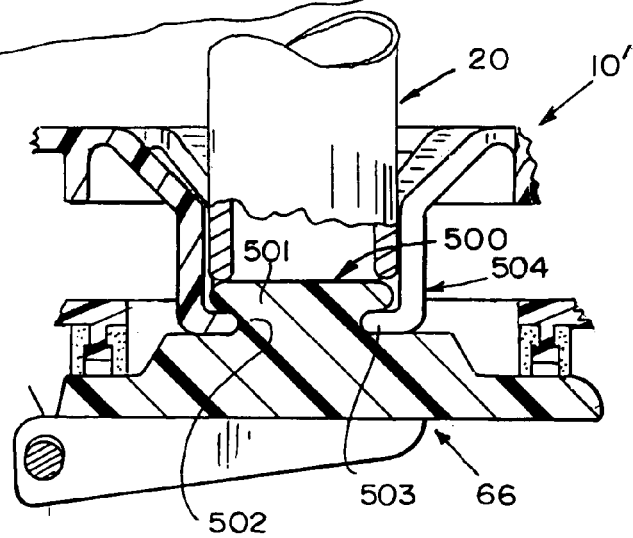
FIG. 13 is a view similar to FIG. 12 showing movement of a small-diameter non-diesel fuel-dispensing pump nozzle into the filler neck to engage a portion of the retainer supported on J-shaped hooks included in the nozzle inhibitor so that further movement of the small-diameter nozzle toward the inner flapper door is blocked before the small-diameter nozzle can open the closed inner flapper door.

As suggested in FIGS. 12-14, retainer 500 is configured to "snap" into a position placing enlarged head 501 above distal portions 506 of hooks 504 so as to retain flapper door 66 in its closed position. Hooks 504 will deflect as enlarged head 501 is moved upwardly to engage hooks 504 in nozzle inhibitor 10' whenever flapper door 66 closes. Hooks 504 are arranged to extend into a radially outwardly opening annular channel 507 formed in retainer 500 upon movement of fingers 503 to the closed position as shown, for example, in FIG. 14 to limit movement of inner flapper door 66 relative to the filler neck or fill tube containing inhibitor 10'.

As suggested in FIG. 13, movement of a small-diameter non-diesel fuel nozzle 20 into a filler neck is blocked by retainer 500 and hooks 504. As suggested in FIGS. 14 and 15, movement of a large-diameter diesel fuel nozzle 22 into the filler neck moves inclined cam ramps 104 relative to one another to move hooks 504 out of the path of nozzle 22 to establish a spread position of fingers 503 so that retainer 500 is released and further movement of nozzle 22 to open flapper door 66 is permitted as shown, for example, in FIG. 16.

In the embodiment shown in FIGS. 12-16, retainer 500 is arranged to retain flapped door 66 in a closed position and block downward movement of a small-diameter nozzle 20.

A large-diameter nozzle 22 can operate nozzle inhibitor 10' to release retainer 500 and flapper door 66 coupled to retainer 500 and so that nozzle 22 can pivot flapper door 66 to an opened position.

The invention claimed is:

1. A nozzle inhibitor apparatus comprising
a fill tube adapted to be coupled to a fuel tank of a motor vehicle having a diesel engine and
inhibitor means for preventing insertion of a small-diameter unleaded fuel nozzle into the fill tube while allowing insertion of a large-diameter diesel fuel nozzle into the fill tube, the inhibitor means includes a foundation mounted in a passageway formed in the fill tube and formed to include a central aperture and fingers mounted on the foundation for movement between a closed position wherein the fingers cooperate to contact a tip of a small-diameter unleaded fuel nozzle having a first outer diameter and moving inwardly in the passageway of the fill tube to block further inward movement of the small-diameter unleaded fuel nozzle in the fill tube relative to the foundation and a spread position wherein the fingers are spread apart from one another to define a widened nozzle-receiving opening between the fingers to allow movement of a large-diameter diesel fuel nozzle having a second outer diameter larger than the first outer diameter past the fingers and through the widened nozzle-receiving opening further inwardly into the passageway of the fill tube,
wherein the foundation has a round top wall having a center point and the foundation includes a border edge with each of the fingers including a root end appended to the foundation at the border edge and an opposite free end and the border edge has a central aperture offset from the center point of the round top wall.

2. The apparatus of claim 1, wherein the foundation further includes an annular side wall arranged to depend from the top wall and surround the free ends of the fingers.

3. The apparatus of claim 1, wherein the free end of each finger includes a J-shaped hook formed to include channel means for receiving a tip of the small-diameter unleaded fuel nozzle to limit further inward movement of the small-diameter unleaded fuel nozzle into the fill tube.

4. The apparatus of claim 1, wherein the free ends of the fingers cooperate to provide means for catching a portion of a small-diameter unleaded fuel nozzle having a first out diameter moving inwardly in the passageway of the fill tube and the central aperture in the top wall of the foundation to block further inward movement of the small-diameter unleaded fuel nozzle upon movement of the fingers to the closed position.

5. The apparatus of claim 4, wherein each finger includes an inclined cam ramp interposed between the free end thereof and the border edge of the top wall of the foundation and wherein the inclined cam ramps of the fingers cooperate to provide means for moving the free ends of the fingers away from one another to define the widened nozzle-receiving opening and to establish the spread position of the fingers in response to engagement of a large-diameter diesel fuel nozzle having a second outer diameter larger than the first outer diameter moving inwardly in the passageway of the fill tube and the aperture in the top wall of the foundation with the inclined cam ramps.

6. The apparatus of claim 5, wherein the foundation further includes an annular side wall arranged to depend from the top wall and surround the inclined cam ramps and the free ends of the fingers.

7. The apparatus of claim 5, wherein each inclined cam ramp is a conic section and has a wider portion appended to the top wall of the foundation at the border edge and a relatively narrower portion appended to the catching means.

8. The apparatus of claim 5, wherein each finger includes a J-shaped hook at the free end and the J-shaped hooks of the fingers cooperate to define the catching means.

9. The apparatus of claim 1, wherein each finger includes a hook arranged to engage a portion of a small-diameter unleaded fuel nozzle moving inwardly in the passageway of the fill tube and in the central aperture defined by the border edge of the top wall upon movement of said finger to assume the closed position and an inclined cam ramp having one end appended to the top wall at the border edge and another end appended to the hook and wherein the inclined cam ramp is arranged to engage a portion of a larger-diameter diesel fuel nozzle moving inwardly in the passageway of the fill tube and in the central aperture defined by the border edge of the top wall and further inward movement of the large-diameter diesel fuel nozzle relative to the inclined cam ramp causes movement of the hook in a radially outward direction relative to a central axis extending through the central aperture formed in the top wall of the foundation to establish the spread position of the fingers.

10. The apparatus of claim 1, wherein the fingers are arranged to lie in circumferentially spaced-apart relation to one another along the border edge and deflect in radially inward and outward directions relative to a central axis passing through the central aperture defined by the border edge.

11. The apparatus of claim 1, wherein each finger includes an inclined cam ramp coupled to the foundation and arranged to engage a tip of a large-diameter diesel fuel nozzle during inward movement of the large-diameter diesel fuel nozzle in the fill tube and a hook coupled to the inclined cam ramp and arranged to catch a portion of a small-diameter unleaded fuel nozzle during inward movement of the small-diameter unleaded fuel nozzle in the fill tube.

12. The apparatus of claim 11, wherein each inclined cam ramp has a wider portion appended to the foundation and a relatively narrower portion coupled to the hook.

13. The apparatus of claim 12, wherein each inclined cam ramp is a conic section.

14. The apparatus of claim 12, wherein each hook includes a short upright tang, a longer upright arm appended to the relatively narrower portion of a companion inclined cam ramp, and a lateral connector interconnecting the short upright tang and the longer upright arm.

15. The apparatus of claim 11, wherein each hook includes a short upright tang, a longer upright arm appended to a companion inclined cam ramp, and a lateral connector interconnecting the short upright tang and the longer upright arm.

16. The apparatus of claim 1, wherein each finger includes a hook configured to catch a portion of a small-diameter unleaded fuel nozzle moving inwardly in the fill tube and cam ramp means interconnecting the foundation and the hook for spreading the fingers apart in response to engagement with a large-diameter diesel fuel nozzle moving inwardly in the fill tube so that the hooks are moved in radially outward directions away from a central axis extending through the central aperture to define the widened nozzle-receiving opening.

17. A nozzle inhibitor apparatus comprising
a fill tube adapted to be coupled to a fuel tank of a motor vehicle having a diesel engine and inhibitor means for preventing insertion of a small-diameter unleaded fuel nozzle into the fill tube while allowing insertion of a large-diameter diesel fuel nozzle into the fill tube, the inhibitor means includes a foundation mounted in a passageway formed in the fill tube and formed to include a central aperture and fingers mounted on the foundation for movement between a closed position wherein the fingers cooperate to contact a tip of a small-diameter unleaded fuel nozzle having a first outer diameter and moving inwardly in the passageway of the fill tube to block further inward movement of the small-diameter unleaded fuel nozzle in the fill tube relative to the foundation and a spread position wherein the fingers are spread apart from one another to define a widened nozzle-receiving opening between the fingers to allow movement of a large-diameter diesel fuel nozzle having a second outer diameter larger than the first outer diameter past the fingers and through the widened nozzle-receiving opening further inwardly into the passageway of the fill tube wherein the fill tube includes an outer nozzle-receiving aperture and an inner nozzle-receiving aperture, the foundation is positioned to lie in the fill tube between the outer and inner nozzle-receiving apertures, and further comprising an inner door mounted for movement relative to the fill tube between an opened position opening the inner nozzle-receiving aperture and a closed position closing the inner nozzle-receiving opening and a retainer coupled to an upwardly facing portion of the inner door to extend toward the foundation, and wherein the fingers include means for gripping the retainer upon movement of the inner door to the closed position and movement of the fingers to the closed position so that the inner door is retained in the closed position until the fingers are moved to assume the spread position to release the retainer.

18. The apparatus of claim 17, wherein the retainer is formed to include a radially outwardly opening annular channel and each finger includes a hook that is arranged to extend into the radially outwardly opening annular channel upon movement of said each finger to the closed position to limit movement of the inner door relative to the fill tube from the closed position to the opened position.

19. The apparatus of claim 18, wherein each finger further includes an inclined cam ramp interposed between the foundation and a companion hook and the inclined cam ramps cooperate to provide means for moving the hooks of the fingers away from one another to establish the spread position of the fingers and release the retainer in response to engagement of a large-diameter diesel fuel nozzle moving inwardly in the fill tube through the outer nozzle-receiving aperture toward the closed inner door with the inclined cam ramps.

20. A nozzle inhibitor apparatus comprising
a fill tube adapted to be coupled to a fuel tank of a motor vehicle having a diesel engine and
inhibitor means for preventing insertion of a small-diameter unleaded fuel nozzle into the fill tube while allowing insertion of a large-diameter diesel fuel nozzle into the fill tube, the inhibitor means includes a foundation mounted in a passageway formed in the fill tube and formed to include a central aperture and fingers mounted on the foundation for movement between a closed position wherein the fingers cooperate to contact a tip of a small-diameter unleaded fuel nozzle having a first outer diameter and moving inwardly in the passageway of the fill tube to block further inward movement of the small-diameter unleaded fuel nozzle in the fill tube relative to the foundation and a spread position wherein the fingers are spread apart from one another to define a widened nozzle-receiving opening between the fingers to allow movement of a large-diameter diesel fuel nozzle having a second outer diameter larger than the first outer diameter past the fingers and through the widened nozzle-receiving opening further inwardly into the passageway of the fill tube wherein the fill tube includes a filler neck adapted to be coupled to a fuel tank and a housing coupled to a free end of the filler neck, the housing is formed to include an outer nozzle-receiving aperture normally closed by an outer door mounted for movement relative to the housing between aperture-closing and aperture-opening positions, the housing is also formed to include an inner nozzle-receiving opening arranged to communicate with a passageway formed in the filler neck and normally closed by an inner door mounted for movement relative to the housing between aperture-closing and aperture-opening positions, and the inhibitor means is located in an interior region of the housing between the outer and inner nozzle-receiving apertures.

21. A nozzle inhibitor apparatus comprising
a fill tube adapted to be coupled to a fuel tank of a motor vehicle having a diesel engine and
a nozzle inhibitor located in a passageway formed in the fill tube and configured to include fingers arranged to lie in circumferentially spaced-apart relation to one another to contact a tip of any fuel-dispensing nozzle inserted into the fill tube and moved inwardly in the passageway to contact the nozzle inhibitor, each finger including a hook arranged to catch a tip of a small-diameter unleaded fuel-dispensing nozzle having a first diameter to block further inward movement of the small-diameter unleaded fuel-dispensing nozzle in the passageway of the fill tube, each finger also including an inclined cam ramp arranged to engage a tip of only a large-diameter diesel fuel-dispensing nozzle having a relatively larger second diameter that is moving inwardly in the passageway of the fill tube to spread the fingers apart to define a widened nozzle-receiving opening between the fingers to allow movement of the large-diameter diesel fuel-dispensing nozzle past the fingers and through the widened nozzle-receiving opening further inwardly into the passageway of the fill tube wherein each inclined cam ramp is a conic section and has a wider portion appended to the nozzle inhibitor and a relatively narrower portion appended to the hook.

22. The apparatus of claim 21, wherein the nozzle inhibitor further includes a foundation mounted in the passageway of the fill tube and the fingers are mounted to the foundation for movement relative to the foundation.

23. The apparatus of claim 22, wherein the foundation includes an interior border edge and the fingers are coupled to the foundation at the border edge.

24. The apparatus of claim 22, wherein the inclined cam ramp is coupled to the foundation.

25. The apparatus of claim 24, wherein each inclined cam ramp has a wider portion appended to the foundation and a relatively narrower portion coupled to the hook.

26. The apparatus of claim 24, wherein each inclined cam ramp is a conic section.

27. The apparatus of claim 21, wherein each hook is J-shaped.

28. A nozzle inhibitor apparatus comprising
a fill tube adapted to be coupled to a fuel tank of a motor vehicle having a diesel engine,
an array of hooks arranged in a circle having a first central axis and located in a passageway having a second central axis formed in the fill tube, the first central axis being offset from the second central axis, the hooks cooperating to define means for limiting inward movement of a small-diameter unleaded fuel nozzle having a first diameter into the passageway of the fill tube, and
cam ramps located in the passageway formed in the fill tube, and cam ramps cooperating to define means for spreading the hooks apart upon engagement with a large-diameter diesel fuel nozzle having a relatively larger second diameter and moving inwardly into the passageway of the fill tube to create a widened nozzle-receiving opening between the hooks to allow further inward movement of the large-diameter diesel fuel nozzle past the hooks and through the widened nozzle-receiving opening into the passageway of the fill tube.

29. The apparatus of claim 28, wherein each hook and a companion of one of the cam ramps cooperate to define a finger.

30. The apparatus of claim 29, further comprising a foundation mounted in the passageway of the fill tube and each of the fingers is coupled to an interior border edge of the foundation sized to define a central aperture and the fingers are arranged to lie in circumferentially spaced-apart relation to one another about the interior border edge.

* * * * *